Sept. 2, 1952     W. H. RADEKE     2,609,409
BATTERY CELL INSPECTING AND TESTING SYSTEM
Filed May 1, 1951
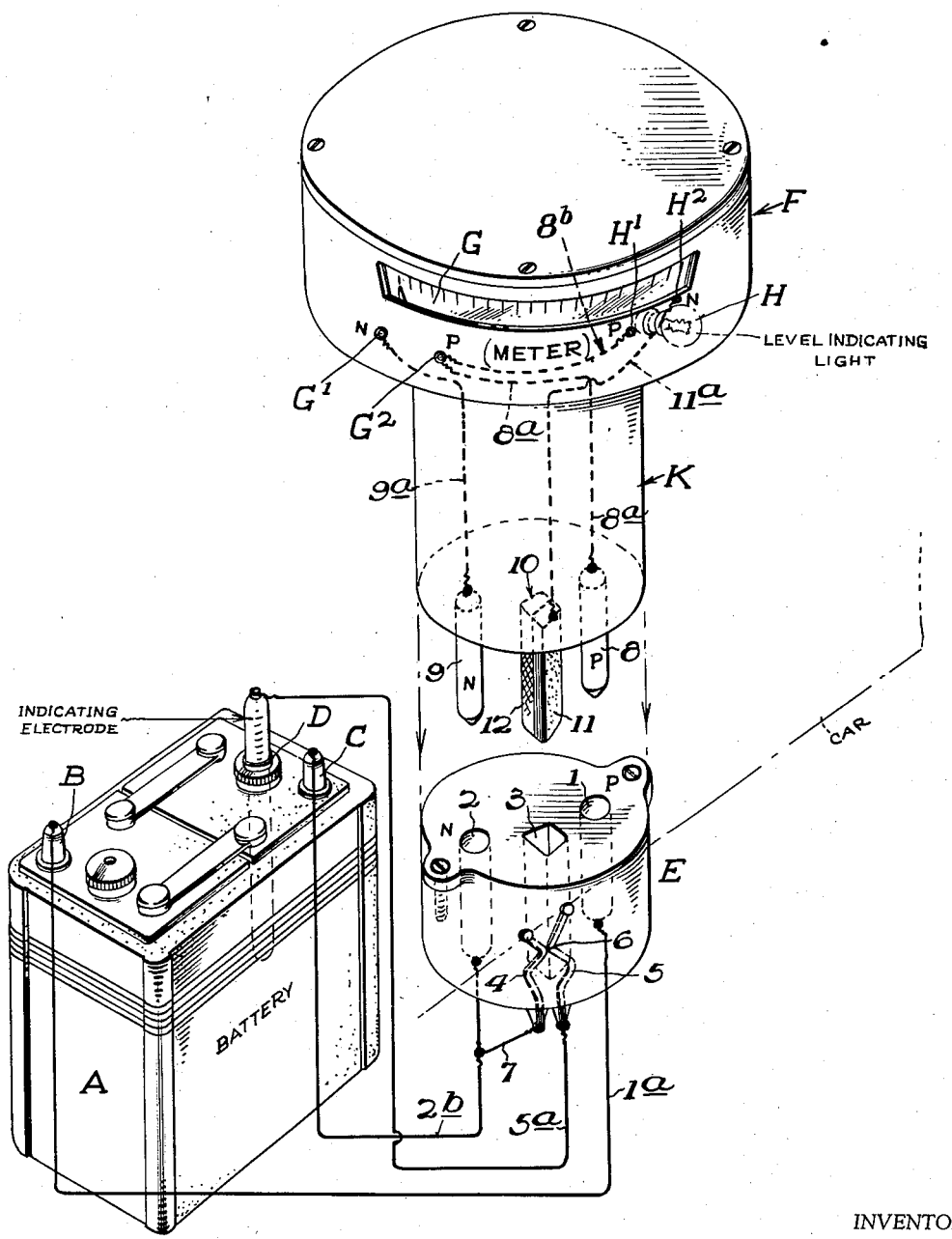
INVENTOR
Walter H. Radeke.
BY
ATTORNEY Patented Sept. 2, 1952

2,609,409

UNITED STATES PATENT OFFICE 2,609,409

BATTERY CELL INSPECTING AND TESTING SYSTEM

Walter H. Radeke, Blue Island, Ill., assignor to Poor & Company, Chicago, Ill., a corporation of Delaware Application May 1, 1951, Serial No. 223,975

4 Claims. (Cl. 136—182)

This invention relates to a system for facilitating inspection of electric batteries and has particular application to installation of batteries on railway cars, and is a continuation-in-part of application Serial No. 90,162, filed April 28, 1949, now Patent Number 2,560,962.

In the railway field, passenger cars, in particular, are provided with a group of storage batteries housed within a box or compartment supported on the underframe or chassis of the car, said batteries supplying current for lamps, the air-conditioning motor, fans, or the like, when the car is standing in service or stopped at stations. These batteries are charged by the usual generator equipment when the car is in motion and are checked after each trip for gravity and electrolyte level by designated maintenance personnel. If the gravity or liquid level is below the predetermined standard in the batteries on a particular car, the number of the car and its battery deficiencies are noted on a gravity chart or on a level chart, and, depending on which fault exists the proper maintenance crew renders the required service. For example, if the gravity reading is low, the battery charging crew connects the batteries to a charging circuit, and if the liquid level is low, the flushing crew fills the battery cells to proper level.

Under the prevailing practice, the gravity and liquid level tests checks are made separately and with different types of rather crude or make-shift test equipment which consumes valuable time, and, moreover, the readings are often inaccurate because of the inefficient type of testing equipment. This is true, notwithstanding the fact that it is customary to check only the pilot cell of the group of batteries. When a number of cars make up a train, it will be apparent that the time required to perform these checks becomes cumulative to the point where servicing is delayed, and, also the possibility of error in making and recording the checks is increased.

Accordingly, the primary object of the present invention is to provide a combined gravity and liquid level testing system for quickly giving the necessary data for each group of batteries within a car battery compartment, and thereby reducing maintenance costs as well as time out for service, while, at the same time, giving accurate checking data. That is to say, the present invention proposes to permanently equip the compartment which houses each group of batteries with the improved testing circuit and equipment described herein, so that with the present circuit and a gravity and liquid level testing device both types of indications can be quickly and accurately obtained, and the chance of erroneous reading is reduced to a minimum because no skill is required in operating the system, and the car is expeditiously maintained at maximum efficiency for service operation.

Another and distinctive object is to provide a special circuit including a liquid level electrode and indicator means whereby such indicator, for example, a lamp, when the circuit thereto is manually closed will quickly or instantaneously give an indication if the electrolyte level is high enough to be satisfactory. If the indicator fails to respond to the testor's demand for information, it will be apparent that water must be added to the cells of the battery system.

A further object is to provide an indicator circuit including an indicator and an electrode wherein the indicator circuit includes a by-pass circuit for the indicator in one side of the line, said by-pass circuit being normally closed to the electrode and only opened when a test is made, the effect of the normally closed circuit being to keep the electrode free from hydrogen bubbles which otherwise form an insulator about the electrode and delays the activation of the indicator when the test circuit is closed thereto.

A still further object is to provide a battery testing system wherein the portion of the test circuits including the by-pass are permanently installed in or about the battery box and connected to a receptacle for receiving the terminals of a plug on the portable tester which may be carried about by the test crew and inserted in the receptacle on each car to obtain the desired gravity and liquid level readings.

A preferred and practical embodiment of the invention is shown in the accompanying drawing, in which the figure is a diagrammatic view illustrating the invention.

Referring to the drawing, the pilot cell of the battery group on the car is designated generally as A. Said cell is provided with the positive terminal B, negative terminal C and the liquid level indicator assembly D, preferably of the type illustrated in application Serial No. 90,162, filed April 28, 1949, now Patent Number 2,560,962. These parts of the pilot cell are wired to the socket terminals 1, 2, 3 of a plug receptacle E appropriately supported in or about the battery box for convenient access by a service crew member carrying the portable plug-in type of test device F having a gravity meter G and a liquid level indicator lamp H which are energized by circuits, later described, upon the insertion of the terminal prongs 8, 9, 10 into the complementary sockets 1, 2, and 3 of the receptacle E.

The circuit connections from the pilot cell A to the receptacle include a wire 1ᵃ between the positive battery terminal B and a conventional single contact in the socket 1; a wire 2ᵇ connecting the negative battery contact C with a conventional single contact in the socket 2; and the special by-pass circuit including the electrode D, the negative terminal C, and the jack type contacts in the socket 3. This socket is preferably of irregular cross-section as compared with sockets 1 and 2 to receive the jack type prong 10 on the tester.

The by-pass circuit which keeps the electrode in one side of the line, for example, the negative side, all the while the system is in use, except when the tester is momentarily used, thereby to keep the electrode free of the insulating envelope of bubbles to insure rapid completion of the circuit to indicator lamp H on making the test, comprises wiring and special contacts in the socket 3. That is to say, the socket 3 is provided with the self-closing spring by-pass contacts 4 and 5, normally engaged as at 6, the contact 4 being in circuit by lead 7 with the wire 2ᵇ of the negative socket 2 and the contact 5 being connected by wire 5ᵃ directly with the electrode D. Thus, the electrode D is in a normally closed circuit due to spring contacts 4, 5, in socket 3, to accomplish the purpose indicated.

The testing device F having the gravity meter G and liquid level indicator H preferably in the form of a lamp, both mounted for ready visual inspection in the head thereof, may have a shank portion K for convenience in handling and the end thereof is provided with single conductor prongs 8 and 9, respectively, for entering sockets 1 and 2 of the receptacle E and the jack type prong 10 of irregular cross section to enter socket 3 and being part conductor 11 and part insulation 12 to maintain a circuit to the lamp H on testing and simultaneously block off the terminal 4 of the by-pass circuit.

The gravity meter G has one terminal G¹ connected by wire 9ᵃ with prong 9 in the negative side of the circuit, and its other terminal G² connected with wire 8ᵃ leading to positive prong 8 and is also connected by wire 8ᵇ with positive terminal H¹ of lamp H. The negative terminal H² of the lamp is connected by wire 11ᵃ with the conductor part 11 of the jack prong 10.

The operation of the system is as follows:

The receptacle E connected with pilot cell A on the car is always available for application of the testing device F by a crew member, and as previously set forth, the electrode D is maintained normally in the negative side of the battery circuit because spring jack contacts 4—5 are normally closed, and thus serve as a self-closing switch.

When the plug end of the tester is applied to the receptacle, prongs 8, 9, 10 enter their related sockets 1, 2, and 3, and the following events occur:

The normally closed by-pass circuit is manually opened because the insertion of jack prong 10 in socket 3 separates switch contacts 4—5 and the insulation part 12 blocks off line 2ᵇ—7 leading to negative battery terminal C while conductor part 11 of the jack prong completes the circuit to level indicator lamp H from electrode D via wire 5ᵃ, terminal 5, conductor part 11, wire 11ᵃ, terminal H², lamp H, terminal H¹, wire 8ᵇ, terminal G², wire 8ᵃ, positive prong 8, socket 1, and line 1ᵃ to positive terminal of the battery A. Thus, the liquid level is given by illuminating the lamp H if the water level in the pilot cell is high enough on the electrode D. If the lamp H does not glow, the service man knows that water is needed.

Simultaneously with the indication rendered by the lamp, the gravity meter operates on the following circuit; from positive battery terminal B current passes through wire 1ᵃ, socket 1, positive prong 8, lead 8ᵃ to terminal G² and thence through the meter G to terminal G¹. From terminal G¹ current passes through wire 9ᵃ to negative prong 9, socket 2, and wire 2ᵇ to negative battery terminal C. Thus, the circuit is completed to the meter to give the gravity indication, namely, the gravity of the electrolyte in the pilot cell.

After the desired readings have been obtained and recorded, the testing device F will be manually withdrawn from the receptacle E and taken by the service man to the next car. Upon withdrawal of the testing device, the circuits to the sockets 1 and 2 of the receptacle will be broken or opened and the by-pass circuit from C will be closed to electrode D over lines 2ᵇ, 7, 4, 6, 5, 5ᵃ, and thus keep the liquid level electrode free of bubbles which would otherwise delay the lighting of the lamp H so that its operation will be assured if the electrolyte level is high enough, simultaneously with the operation of the gravity meter G.

The normally closed jack contacts 4 and 5 and the duplex prong 10 cooperate to form switch means respectively for closing the circuit to the lamp H and to the electrode D upon the insertion and removal of the tester prong into the receptacle.

By placing the electrode in the negative side of the circuit, in addition to the advantages heretofore set forth, the deterioration rate is much less than if it were placed in the positive side, and the resulting effect over a period of time is that the electrode merely changes to sponge lead. While the by-pass circuit may be included in the positive side of the circuit, the effect in this instance would be that the electrode would tend to oxidize and deteriorate more rapidly by forming lead peroxide. Thus, from a practical standpoint, it is more advantageous to place it in the negative side.

Without further description, it is believed that the invention will be readily understood by those skilled in the art, and it will, of course, be understood that changes may be resorted to within the scope of the appended claims.

I claim:

1. A battery cell inspecting and testing system, comprising, in combination, a testing device, a battery having positive and negative terminals, a liquid level indicating electrode, positive and negative contacts in circuit with said positive and negative terminals and for connection with said testing device, and a normally closed by-pass circuit including spring contacts respectively in circuit with said electrode and the negative terminal of the battery, said contacts being separated by related parts of the testing device to open the by-pass circuit during testing.

2. A battery cell inspecting and testing system, comprising, in combination, a testing device having a gravity meter and a liquid level indicator, positive and negative prongs on the said device and a by-pass jack type prong including a longitudinal conductor part and a longitudinal insulating part, circuit connections between the gravity meter, liquid level indicator and said positive and negative prongs and the by-pass jack type prong, a receptacle having positive and negative sockets for receiving the positive and negative prongs of the testing device and also having a socket for receiving the jack type prong, a pair of normally engaged spring contacts in the last mentioned socket, a by-pass circuit including said spring contacts and the negative terminal and the electrode, a circuit connection between the positive socket of the receptacle and the positive terminal of the battery, and a circuit connection between the negative socket of the receptacle and the negative terminal of the battery, whereby upon applying the testing device to the receptacle, simultaneously instantaneous indications will be given by the gravity meter and liquid level indicator.

3. In a battery cell inspecting and testing system, a receptacle having positive and negative sockets and a jack socket, a pair of normally engaged by-pass contacts in the jack socket, a battery having positive and negative terminals and a liquid level indicating electrode, circuit connections between the by-pass contacts and the negative battery terminal and the electrode, and circuit connections respectively between the negative battery terminal and the negative socket and the positive battery terminal and the positive socket.

4. A battery cell inspecting and testing system, including, a battery having positive and negative terminals, a liquid level indicating electrode, a circuit including the said negative terminal and the electrode, and normally closed switch means in said circuit to maintain the electrode included therein to keep the electrode free of an insulating envelope of bubbles whereby when said normally closed switch means is opened for use the electrode will quickly respond to a circuit including said positive terminal.

WALTER H. RADEKE.

REFERENCES CITED

The following references are of record in the file of this patent:

UNITED STATES PATENTS

| Number | Name | Date |
|---|---|---|
| 1,338,170 | Carlon | Apr. 27, 1920 |
| 1,426,868 | Haskins | Aug. 22, 1922 |
| 1,818,185 | Yull | Aug. 11, 1931 |
| 1,887,656 | Myers | Nov. 15, 1932 |